United States Patent [19]
Haendle et al.

[11] Patent Number: 5,264,932
[45] Date of Patent: Nov. 23, 1993

[54] VIDEO PROCESSING SYSTEM HAVING A FILTER CIRCUIT WITH A SPATIAL-FREQUENCY HIGH-PASS FILTER CHARACTERISTIC

[75] Inventors: Joerg Haendle, Erlangen; Manfred Ritter, Forchheim; Paul Marhoff, Erlangen, all of Fed. Rep. of Germany

[73] Assignee: Siemens Aktiengesellschaft, Munich, Fed. Rep. of Germany

[21] Appl. No.: 974,515

[22] Filed: Nov. 12, 1992

[30] Foreign Application Priority Data

Nov. 13, 1991 [DE] Fed. Rep. of Germany ....... 4137373

[51] Int. Cl.⁵ .............................................. H04N 5/20
[52] U.S. Cl. .................................... 358/160; 358/166; 378/99
[58] Field of Search ..................... 358/160, 162, 166; 378/99; 382/54

[56] References Cited

U.S. PATENT DOCUMENTS

| | | | |
|---|---|---|---|
| 4,825,297 | 4/1989 | Fuchsberger et al. | 358/166 X |
| 4,860,104 | 8/1989 | Katsuyama | 358/167 |
| 4,979,043 | 12/1990 | Suzuki et al. | 358/166 X |
| 5,089,890 | 2/1992 | Takayama | 358/169 X |
| 5,091,925 | 2/1992 | Haendle et al. | 378/99 |

FOREIGN PATENT DOCUMENTS

| | | |
|---|---|---|
| 427564 | 5/1991 | European Pat. Off. |
| 3327218 | 2/1985 | Fed. Rep. of Germany |
| 3417386 | 11/1985 | Fed. Rep. of Germany |
| 4100263 | 7/1991 | Fed. Rep. of Germany |
| 1-309578 | 12/1989 | Japan |

Primary Examiner—Mark R. Powell
Attorney, Agent, or Firm—Hill, Steadman & Simpson

[57] ABSTRACT

A video processing system, of the type used for portraying x-ray images, has a filter circuit with a spatial-frequency high-pass filter characteristic, the filter circuit including an amplitude-dependent separating filter having outputs to which respective spatial-frequency high-pass filters having different limit frequencies and/or having different kernel sizes are connected. The spatial-frequency high-pass filters are connected to the output of the overall filter circuit through an addition unit, so that the respective outputs of the spatial-frequency high-pass filters can be combined in different amounts to form the output of the overall filter circuit.

10 Claims, 1 Drawing Sheet

VIDEO PROCESSING SYSTEM HAVING A FILTER CIRCUIT WITH A SPATIAL-FREQUENCY HIGH-PASS FILTER CHARACTERISTIC

BACKGROUND OF THE INVENTION

1. Field of the Invention

The present invention is directed to a video processing system having a filter circuit with a spatial-frequency high-pass characteristic, of the type suitable for use in an x-ray diagnostics installation for displaying an x-ray image, with enhanced fine contrast.

2. Description of the Prior Act

A problem in the video portrayal of x-ray images is that video images of this type have a very high dynamic (i.e., range of signal processing capability), because a relatively dart heart shadow must be transmitted and displayed as well as the extremely bright lung area. The physician, however, is hindered in interpreting the image in a thorax examination due to this extremely high dynamic, i.e. excessively bright lung fields.

A video installation of this type is described in German OS 34 17 386, which has a filter circuit having a variable high-pass filter characteristic connected to a control circuit which controls the filter circuit so that the full filter effect is employed in the presence of large signals, and substantially no high-pass filtering takes place in image regions having small signals. An optimum detail enhancement in all amplitude ranges, however, is not achieved in this known system.

SUMMARY OF THE INVENTION

It is an object of the present invention to provide a video processing system of the type described above which enables an optimum enhancement of detail contrast in all amplitude ranges of the image to be portrayed, with an arbitrary amount of mixing of the amplitude ranges in the image.

The above object is achieved in accordance with the principles of the present invention in a video processing system having a filter circuit with an amplitude-dependent separating filter have a plurality of outputs to which different spatial-frequency high-pass filters are respectively connected, and having an addition unit connected to the outputs of the high-pass filters so that those outputs can be selectively combined to form the overall output of the filter circuit. A significantly improved enhancement of detail is obtained in this system in all amplitude ranges, by the use of at least two amplitude-dependent spatial-frequency high-pass filters having, for example, respectively different limit frequencies and/or kernel sizes.

Preferably a logarithmic amplifier is connected preceding the separating filter. By the use of such a logarithmic amplifier, blood vessel contrasts remain the same, i.e., they are not modulated by the superimposition of tissue. The logarithmic amplifier, however, may alternatively be connected at an output of the separating filter. Preferably, an amplifier having a gamma characteristic or a linear characteristic is connected to a further output of the separating filter.

As noted above, the spatial-frequency high-pass filters preferably have different limit frequencies and/or different kernal sizes, whereby a kernal size of 15 through 50 pixels is preferable in the spatial-frequency high-pass filter for the dark image region (low signal amplitudes) and a kernal size of 7 through 30 pixels is preferable for the spatial-frequency high-pass filter for the bright image region (high signal amplitudes). Any desired matching or combination of the bright and dark image regions can be achieved using the addition unit in a embodiment wherein the addition unit undertakes a different weighting of the input signals. It has proven expedient to use two spatial-frequency high-pass filters, however, the detail enhancement is further improved if three or more different spatial-frequency high-pass filters are employed.

DESCRIPTION OF THE PREFERRED EMBODIMENTS

Figure 1:
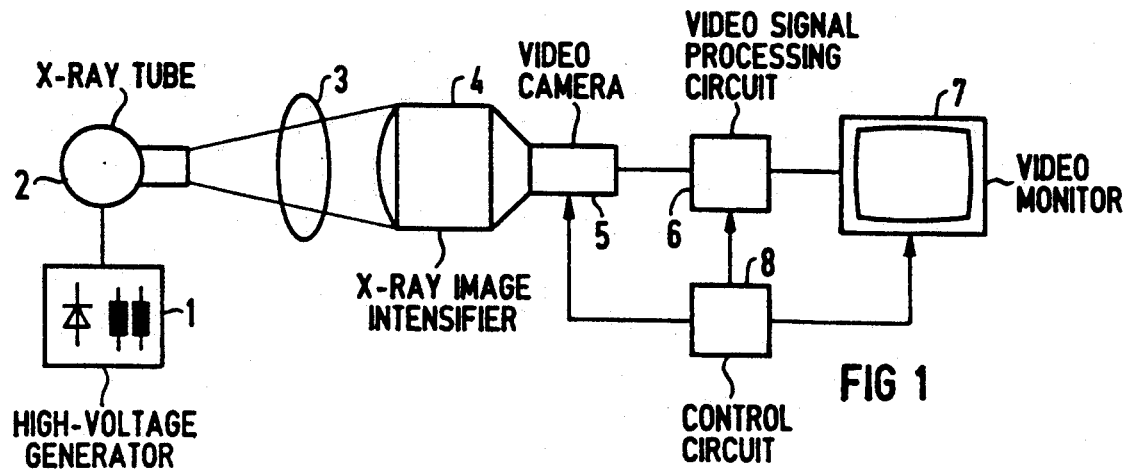
FIG. 1 is a block circuit diagram of the basic components of an x-ray diagnostics installation, in which a video processing system constructed in accordance with the principles of the present invention can be employed.

The basic components of an x-ray diagnostics installation, in which a video processing system constructed in accordance with the principles of the present invention can be used, are shown in FIG. 1. The x-ray diagnostics installation includes an x-ray tube 2 which is supplied by a high-voltage generator 1, and which generates an x-ray beam in which a patient 3 is situated. The x-ray image is converted in a known manner into a video signal by an x-ray image intensifier 4 with a video camera 5 coupled thereto, the coupling taking place via suitable optics (not shown). A display monitor 7 is connected to the output of the video camera 5 via a video processing circuit 6. The video processing circuit 6 is constructed in accordance with the principles of the present invention, as described below, and in addition to including the below-described filter circuit, the processing circuit 6 can also include various transducers and image memories, which are not important for explaining the operation of the present invention and are therefore not shown. A control unit 8 controls the synchronization of the chronological functional executions of the video installation consisting of the video camera 5, the processing circuit 6 and the monitor 7.

Figure 2:
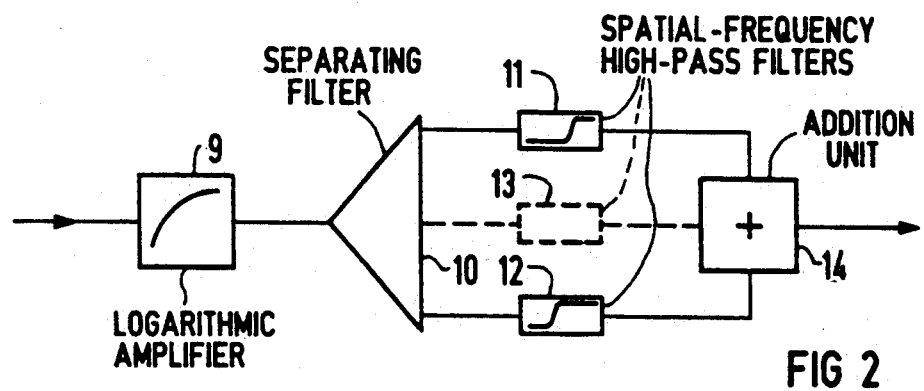
FIG. 2 is a block circuit diagram of a first embodiment of a video processing system constructed in accordance with the principles of the present invention.

A first embodiment of a filter circuit in accordance with the principles of the present invention, forming a part of the processing circuit 6, is shown in FIG. 2. The incoming video signal from the video camera 5 is supplied to a logarithmic amplifier 9, which is connected to an amplitude-dependent separating filter 10. Signals having respectively different amplitudes (i.e., within respectively different amplitude ranges) are present at the outputs of the separating filter 10. Signals having a high amplitude are supplied to a first spatial-frequency high-pass filter 11, and the signals having low amplitude are supplied to a second spatial-frequency high-pass filter 12. The high-pass filters 11 and 12 have different limit frequencies and/or different kernel sizes. The first high-pass filters 11 and 12 have different limit frequencies and/or different kernel sizes. The first high-pass 11 has a high limit frequency and, for example, a kernel size of 7 through 30 pixels and the second high-pass 12 has a low limit frequency and a kernel, for example, 15 through 50 pixels. The outputs of the spatial-frequency high-pass filters 11 and 12 are combined in an addition circuit 14, having an output which forms the output for the overall filter circuit, which is supplied for display on the monitor 7.

The addition unit 14 is constructed so that the degree of mixing or combination of the outputs of the spatial-frequency high-pass filters 11 and 12 can be differently selected. Preferably, a higher degree of mixing (weighting) is employed at the output of the first high-pass 11 for a bright image region as compared to the second high-pass 12 for the dark image region.

The effectiveness of the filter circuit can be further enhanced if, for example, three spatial-frequency high-pass filters are employed, as indicated by the further high-pass filter 13 shown with dashed lines and connected between a further output of the separating filter 10 and a further input of the addition unit 14. The third spatial-frequency high-filter 13, if used, has a medium amplitude range allocated thereto, i.e., the filter values of the spatial-frequency high-pass filter 13 will lie between the values of the high-pass filters 11 and 12. The output signal of the high-pass filter 13 can also be weighted appropriately by the addition unit 14.

Figure 3:
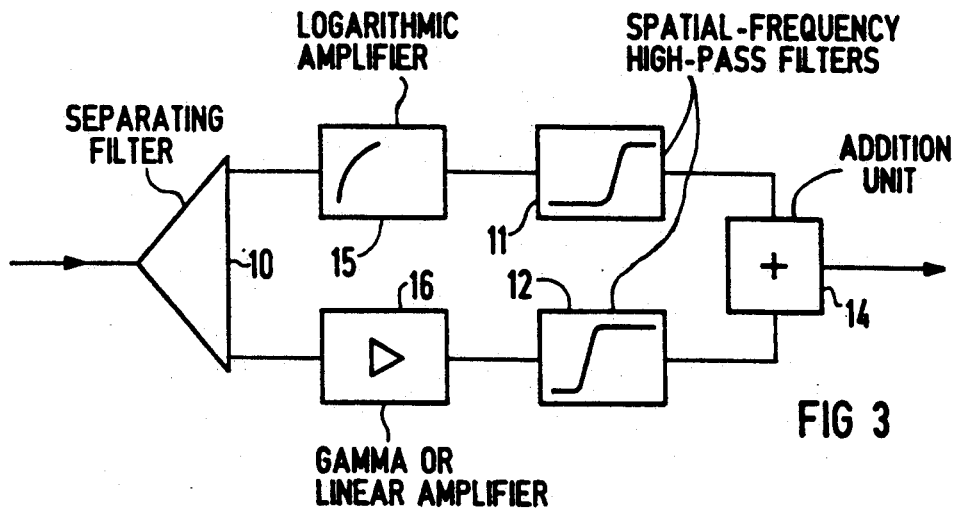
FIG. 3 is a block circuit diagram of a second embodiment of a video processing system constructed in accordance with the principles of the present invention.

Another embodiment of the relevant portion of the processing circuit 6, constructed in accordance with the principles of the present invention, is shown in FIG. 3. In this embodiment, the output signal from the video camera 5 is supplied directly to the amplitude-dependent separating filter 10, which has first output to which a logarithmic amplifier 15 is connected, the logarithmic amplifier 15 being connected in turn to the first spatial-frequency high-pass filter 11. The second output of the separating filter 10 is supplied to the second spatial-frequency high-pass filter 12 via an amplifier 16 having a gamma characteristic or a linear characteristic. The respective outputs of the high-pass filters 11 and 12 are again supplied to the monitor 7 via the addition unit 14.

By using at least two amplitude-dependent spatial-frequency high-pass filters 11 and 12, a more beneficial enhancement of detail is obtained in all amplitude ranges. As a result of the different kernel sizes of the two high-pass filters, the enhancement of detail contrast is also improved in all amplitude ranges. The degree of mixing of the outputs from the respective filters can be adapted in any desirable manner in dark and bright image regions by appropriate weighting within the addition unit 14. Video signals having a large dynamic can thus be processed so that the bright image fields do not hinder a physician interpreting the image viewed on the monitor 7.

Although modifications and changes may be suggested by those skilled in the art, it is the intention of the inventors to embody within the patent warranted hereon all changes and modifications as reasonably and properly come within the scope of their contribution to the art.

We claim as our invention:

1. In a video signal processing circuit for use with a video display, the improvement of a filter circuit having a spatial-frequency high-pass filter characteristic comprising:
   an amplitude-dependent separating filter supplied with a video signal input and having a plurality of outputs;
   a plurality of different spatial-frequency high-pass filters respectively connected to said outputs of said separating filter, each spatial-frequency high-pass filter having a limit frequency and each limit frequency being different, each spatial-frequency high-pass filter having an output; and
   addition means having a plurality of inputs respectively connected to said outputs of said spatial-frequency high-pass filters for selectively combining said outputs of said spatial-frequency high-pass filters for forming an overall filter circuit output, supplied to said video display.

2. The improvement of claim 1 further comprising:
   a logarithmic amplifier connected preceding said separating filter.

3. The improvement of claim 1 further comprising a logarithmic amplifier connected between an output of said separating amplifier and the input of the spatial-frequency high-pass filter connected to that separating filter output.

4. The improvement of claim 1 further comprising an amplifier having a gamma filter characteristic connected between an output of said separating filter and the input of the spatial-frequency high-pass filter connected to that separating filter output.

5. The improvement of claim 1 further comprising an amplifier having a linear filter characteristic connected between an output of said separating filter and the input of the spatial-frequency high-pass filter connected to that separating filter output.

6. The improvement of claim 1 wherein each of said spatial-frequency high-pass filters has a different kernel size.

7. The improvement of claim 6 wherein one of said outputs of said separating filter is a low amplitude output for dark image regions and another of said separating filter outputs is a high amplitude output for bright image regions, and wherein a spatial-frequency high-pass filter connected to said low amplitude output has a kernel size in the range of 15 through 50 pixels and wherein a spatial-frequency high-pass filter connected to said high amplitude output has a kernel size in the range of 7 through 30 pixels.

8. The improvement of claim 1 wherein said addition means is a means for differently weighting the outputs of the respective spatial-frequency high-pass filters.

9. The improvement of claim 1 wherein said plurality of spatial-frequency high-pass filters is two.

10. The improvement of claim 1 wherein said plurality of spatial-frequency high-pass filters is at least three.

* * * * *